United States Patent [19]
Hull, Jr.

[11] 3,788,426
[45] Jan. 29, 1974

[54] LOW HEAT RISE GEARBOX
[75] Inventor: Thomas N. Hull, Jr., Marblehead, Mass.
[73] Assignee: General Electric Company, Lynn, Mass.
[22] Filed: Jan. 21, 1970
[21] Appl. No.: 4,625

[52] U.S. Cl. .................. 184/1 E, 184/6 TT, 184/13
[51] Int. Cl. ............................................. F16n 7/26
[58] Field of Search....... 184/6 TT, 104 R, 6 E, 6 F, 184/6 R, 11, 11 A, 13, 1 E; 74/467, 468

[56] References Cited
UNITED STATES PATENTS
1,554,081  9/1925  Garrett .......................... 74/467 X
1,749,077  3/1930  Kennedy ....................... 184/6 TT
1,783,978  12/1930  Perry .......................... 184/11 X
1,875,564  9/1932  Croft ............................. 184/6 TT FOREIGN PATENTS OR APPLICATIONS
868,233  5/1961  Great Britain ................... 184/6 TT
951,364  3/1964  Great Britain ................... 184/6 TT Primary Examiner—Manuel A. Antonakas
Attorney, Agent, or Firm—Edward S. Roman

[57] ABSTRACT

A gearbox structure adapted to preclude excessive heat input to the gear and bearing lubricant. The structure includes a stationary perforated screen surrounding at least one of the gears and adapted to collect oil droplets thrown tangentially and radially from the gear and direct them away from the gears to a scavenge outlet, from where the lubricant is transported to a lubricant supply pump and then recirculated through the gears and bearings.

7 Claims, 4 Drawing Figures

INVENTOR.
THOMAS N. HULL, JR.
BY

ATTORNEY

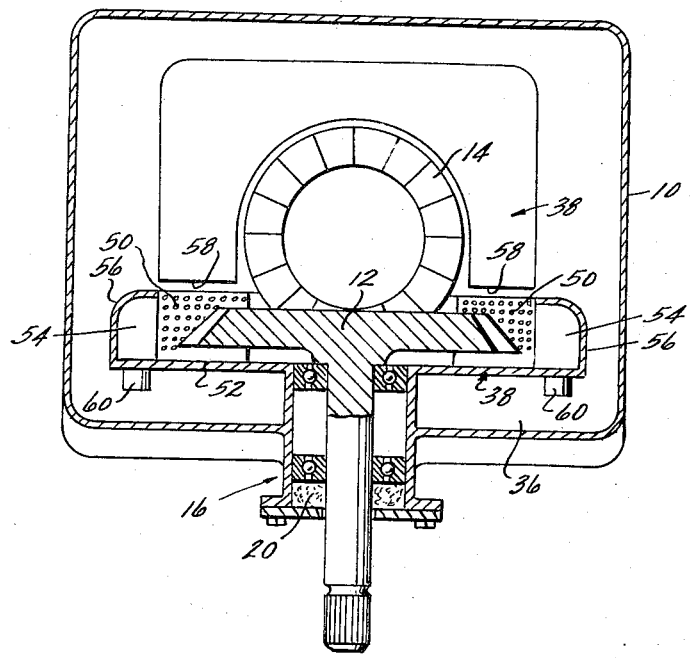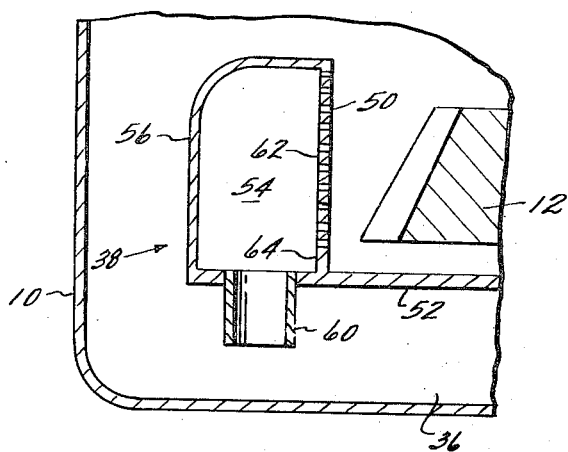

LOW HEAT RISE GEARBOX

BACKGROUND OF THE INVENTION

The invention relates to gearbox structures and more particularly to such structures having recirculating lubricant supply systems.

Gearboxes operating in high temperature environments such as aircraft engines must be configured to preclude excessive heat generation by the gearing itself so that lubricants can be maintained at temperatures below which they will break down and become ineffective. A common method of precluding excessive lubricant temperature rise is to circulate the lubricant outside the gearbox and away from the excessive temperature environment through heat exchanger means which will cool it, and then return it to the gears and bearings in the gearbox. One parameter which significantly determines the required flow of recirculating oil is the amount of heat added to the oil by the gearing itself through friction and turbulence generated in the lubricating fluid during its residence time in the gearbox. The amount of cooling required is directly related to the extent to which heat is contributed to the lubricant by this factor. It is desirable, therefore, that means be provided internally of the gearbox to minimize the heat generated by turbulence in the fluid lubricating the gears and bearings therein.

The applicant has discovered that a significant contributor to lubricant heat rise and turbulence which contributes to heat rise results from oil particles being thrown at a high velocity by the rotating equipment and impacting on the static and rotating parts several times prior to returning to the gearbox scavenge port. The response to this discovery is a novel structural combination which successfully minimizes the lubricant temperature rise caused by the described phenomenon.

BRIEF DESCRIPTION OF THE INVENTION

Briefly stated, the invention comprises the combination of a rotating gear system with a stationary collecting means comprising a perforate screen member at least partially peripherally surrounding all or part of the said gears, and a fluid channelling means on the side of the screen which is opposite the gears to channel lubricant away from the gears. The lubricant, which is thrown radially and tangentially outward from the rotating gears, strikes the perforated mesh screen which removes a large portion of kinetic energy from the oil droplets and permits the oil to pass through the perforations and into the channelling means with a velocity approximately in the direction of the perforations. The lubricant is trapped in the channelling means and then drains away from the gear.

BRIEF DESCRIPTION OF THE DRAWINGS

While the specification concludes with claims particularly pointing out and distinctly claiming the subject matter of this invention, it is believed that it will be better understood by reference to the discussion below and the accompanying drawings in which:

FIG. 3 is a section view taken along the line 3—3 of FIG. 2; and

FIG. 4 is partially fragmented section view taken along the line 4—4 of FIG. 2

DESCRIPTION OF THE PREFERRED EMBODIMENT

Figure 1:
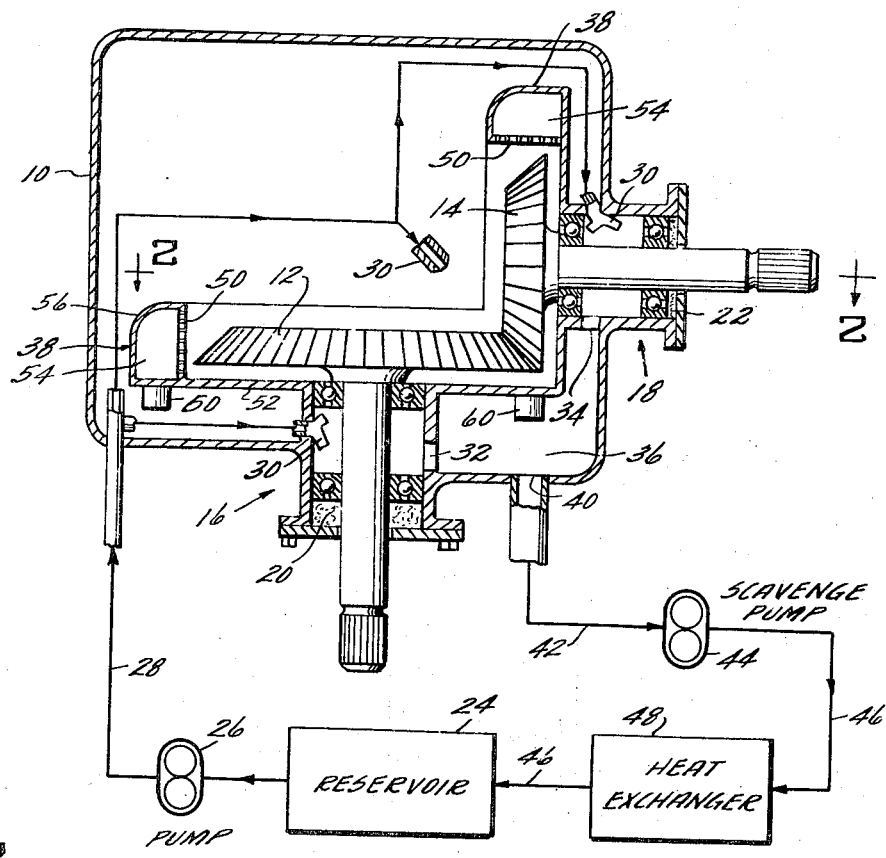
FIG. 1 is a partially section, partially schematic view of a gearbox and lubrication system.

Referring to the drawings, FIG. 1 illustrates a gearbox system comprising an enclosed gearbox housing 10 in which intermeshing gears 12 and 14 are rotatably supported by suitable bearing means 16 and 18 respectively. Seals 20 and 22 are included in bearing means 16 and 18 to prevent the leakage of lubricant from the gearbox around the respective shafts.

Lubricant is supplied to the rotating parts of the gearbox from a reservoir 24 by a pump 26, which pumps lubricant through conduits 28 to a plurality of nozzles 30. Nozzles 30 are oriented and adapted to spray a supply of lubricant on the moving gearbox parts, i.e., bearing means 16 and 18 and gears 12 and 14, thereby both lubricating and cooling the parts. Lubricant delivered to the bearing means 16, 18 after performing its intended function is drained through bearing area drain ports 32, 34 respectively to a sump area 36. Lubricant supplied to gears 12, 14 is collected in collecting means 38, to be hereinafter described in more detail, and similarly discharged into sump area 36.

Sump area 36 includes a scavenge port which drains the lubricant in sump 36 through a conduit 42 to a scavenge pump 44. Scavenge pump 44 pumps the scavenged lubricant to reservoir 24 through conduits 46. Thus, the lubricant is circulated outside the enclosed housing 10 where it can be cooled either by mixing with lubricant in reservoir 24 or by a heat exchanger 48 as is shown interposed in conduit 46. Heat exchanger 48 can be an oil to air heat exchanger or a fluid to fluid heat exchanger, and in an application such as an aircraft engine may be a fuel to oil heat exchanger wherein fuel being pumped into the engine is used to cool the oil. Although the structure shown includes an external pumping loop and heat exchanger means, it might be preferable in some applications where the immediate environment of the enclosed housing 10 is not overly severe to provide means of cooling the sump directly, such as, for example, convection cooling fins, and providing for internal passageways corresponding to conduits 28, 42, 46, and for internal pumping means. In other words, in some applications, sump 36 could act as a lubricant reservoir and provide an oil to air or oil to fluid heat exchanger internally of the enclosed housing 10.

A significant contribution to minimization of the heat rise in the gearbox of this invention is made by the collecting means 38. Applicant has discovered that in a gearbox which does not have such a collecting means oil particles sprayed on to the gears as by a nozzle 30 are thrown at high velocity by the rotating gears and impacted several times against the stationary and rotating parts in the gearbox prior to returning to the scavenge port or draining away from the gear. This extensive impacting introduces large amounts of energy into the lubricating oil, which energy is seen in the form of an oil temperature rise. Applicant's response to this discovered phenomenon has been to provide the collecting means 38 around at least part of the gears in an enclosed gear train. Inasmuch as the phenomenon described contributes to an oil temperature rise above that which would normally be experienced due only to the environment of the enclosed housing 10 and the normal friction of bearing means 16, 18 and gears 12, 14, the described phenomenon can make a difference in some applications over whether external cooling of the lubricating oil is required at all, and can similarly make a difference in the capacity required of such an external cooling loop if one is required.

Figure 2:
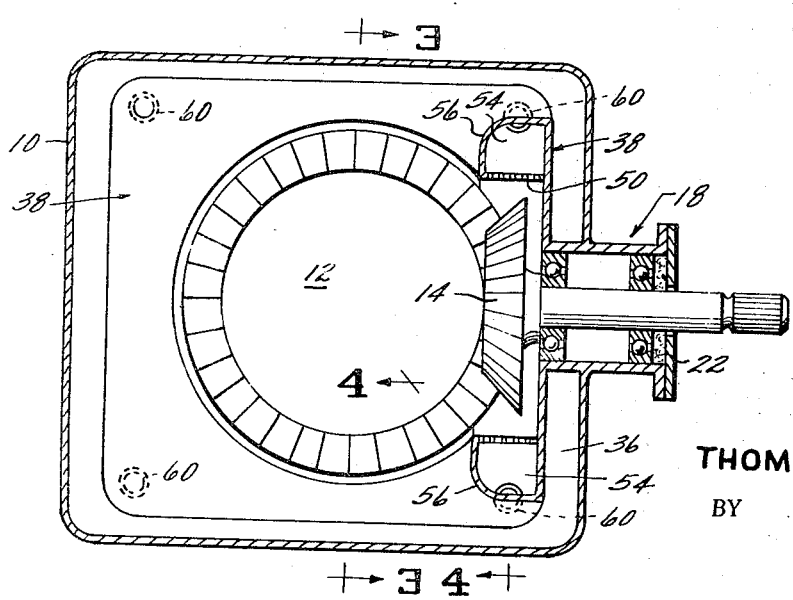
FIG. 2 is a partially fragmented section view taken along the line 2—2 of FIG. 1.

Collecting means 38 comprises a perforate screen 50 supported by a plate 52 and at least partially surrounding one or more of gears 12, 14 as shown in FIGS. 2 and 3. A drainage channel 54 is defined on the outside of each said screen by screen 50, plate 52, and an outer wall 56. The drainage channel 54 of the vertically oriented collecting means 38 is drained through the open lower ends 58 (see FIG. 3), and the horizontally oriented collecting means 38 is drained through one or more drain ports 60.

FIG. 4 illustrates in more detail the nature and location of drain ports 60 and additionally illustrates definition of drainage channel 54 by plate 52, screen 50, and outer wall 56. Screen 50 is formed with a perforate portion 62 which encompasses the thickness of gear 12 (or gear 14 as the case may be) and a solid portion 64 adjacent plate 52, the solid portion being provided to form a fully defined channel.

Operation of the gearbox with collecting means 38 is as follows. Lubricating oil supplied to gears 12, 14 through the appropriate nozzle 30 forms droplets which come into contact with the gears 12, 14 and are thrown radially and tangentially outward from the gears. The oil droplets strike the perforated screen 50 which removes a large portion of their kinetic energy and allows the oil to pass through the perforations. The oil is then trapped in the volume which includes channel 54 and drains down through drain ports 60 or the open lower ends 58 as the case may be into sump area 36, from where it is scavenged and recirculated through the gearbox as described above. The presence of the perforated screen 50, by slowing down the oil particles and allowing them to pass away from the gears, precludes a significant amount of the repeated impacting on stationary and rotating parts which would occur absent screen 50, and thus precludes the temperature rise in the oil due to such impacting action.

Having above described a preferred embodiment of the invention, though not exclusive of all possible equivalents, and having described the advantages and operation of the invention, what is desired to be secured by Letters Patent is that stated in the claims appearing immediately below.

What is claimed is:

1. A low heat rise gearbox system comprising:
   an enclosed gearbox housing structure which includes at least two intermeshing gears rotatably supported therein by bearing means;
   lubricant supply means for delivering lubricant to said bearing means and said intermeshing gears from a reservoir; and
   scavenge means for removing lubricant from the vicinity of said gears and said bearing means and returning it to said reservoir, said scavenge means including stationary collecting means for collecting lubricant thrown from said gear, said collecting means comprising a screen member at least partially peripherally surrounding at least one of said gears, and means on the side of said screen which is opposite said gear for channelling lubricant away from said gear.

2. The gearbox system recited in claim 1 wherein said lubricant supply means comprises a pumping element, fluid nozzles located adjacent said bearing means and said gears and adapted to direct lubricant thereon, and conduit means connecting said pump element with said fluid nozzles.

3. The gearbox system recited in claim 2 wherein said lubricant supply means is located externally of said enclosed gearbox structure and includes an external reservoir; and further wherein said scavenge means includes a scavenge pump located externally of said enclosed gearbox structure.

4. The gearbox system recited in claim 3 wherein said scavenge means further includes a fluid drain port in the said housing structure, a conduit connecting said drain port with said scavenge pump, and means on said channelling means for directing lubricant toward said drain port.

5. The gearbox system recited in claim 4 wherein said scavenge means includes a heat exchanger interposed between said scavenge pump and said reservoir.

6. A method of reducing the heat rise in a gearbox which comprises:
   collecting lubricant thrown from at least one of said gears with a device comprising a screen member at least partially surrounding said gear and means on the side of said screen which is opposite said gear for channelling lubricant away from said gear, and removing the collected lubricant from said screen device.

7. The method recited in claim 6 wherein said method includes the further steps of cooling the said lubricant with means external of the gearbox and recirculating the lubricant to the said gearbox to lubricate the gears and bearings therein.

* * * * *